C. ANDRÉ.
PORTABLE OVEN.
APPLICATION FILED APR. 3, 1911.

1,020,174.

Patented Mar. 12, 1912.
9 SHEETS—SHEET 1.

Witnesses:
Jean Germain
Guillaume Pioche

Inventor:
Charles André.

C. ANDRÉ.
PORTABLE OVEN.
APPLICATION FILED APR. 3, 1911.

1,020,174.

Patented Mar. 12, 1912.
9 SHEETS—SHEET 6.

Witnesses:

Inventor:

C. ANDRÉ.
PORTABLE OVEN.
APPLICATION FILED APR. 3, 1911.

1,020,174.

Patented Mar. 12, 1912.
9 SHEETS—SHEET 7.

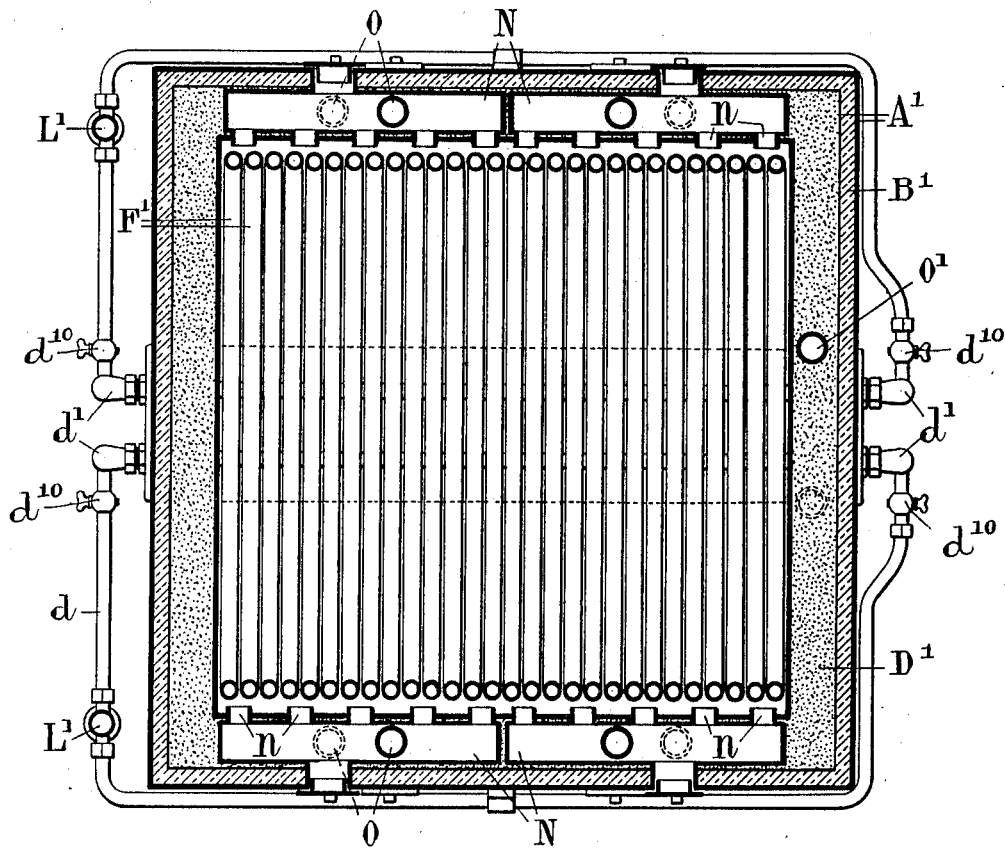

C. ANDRÉ.
PORTABLE OVEN.
APPLICATION FILED APR. 3, 1911.
1,020,174.
Patented Mar. 12, 1912.
9 SHEETS—SHEET 9.
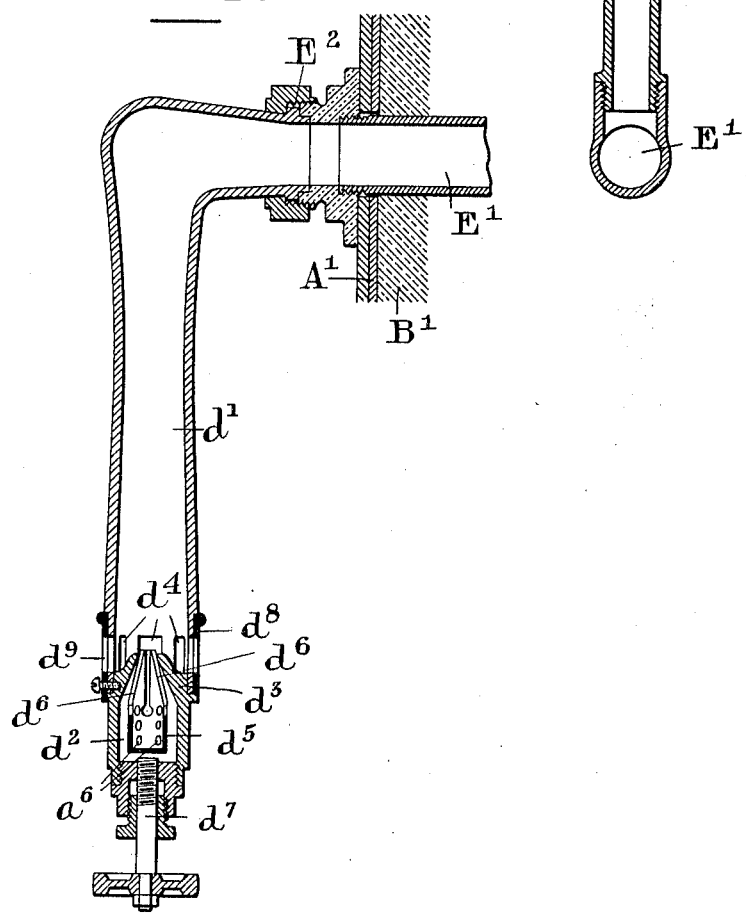

UNITED STATES PATENT OFFICE.

CHARLES ANDRÉ, OF LYON, FRANCE.

PORTABLE OVEN.

1,020,174.     Specification of Letters Patent.     Patented Mar. 12, 1912.

Application filed April 3, 1911. Serial No. 618,714.

*To all whom it may concern:*

Be it known that I, CHARLES ANDRÉ, citizen of the French Republic, residing at Lyon, in France, have invented certain new and useful Improvements in Portable Ovens, of which the following is a specification.

This invention relates to a portable baker's oven adapted to be heated by the combustion of gas or combustible vapor and by radiation from a heated liquid.

Two embodiments of the invention are illustrated in the accompanying drawings, in which:—

Figure 1:
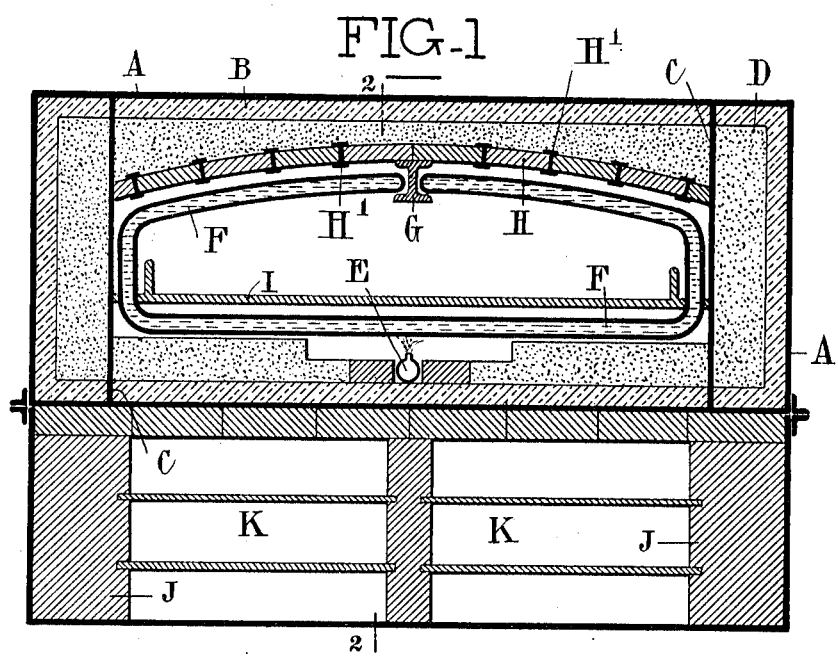
Figure 2:
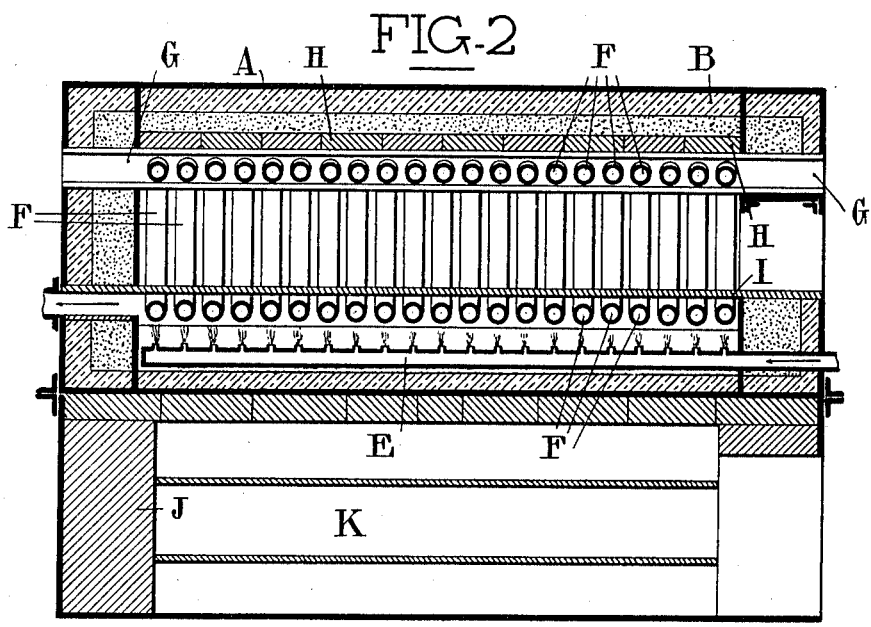
Figure 3:
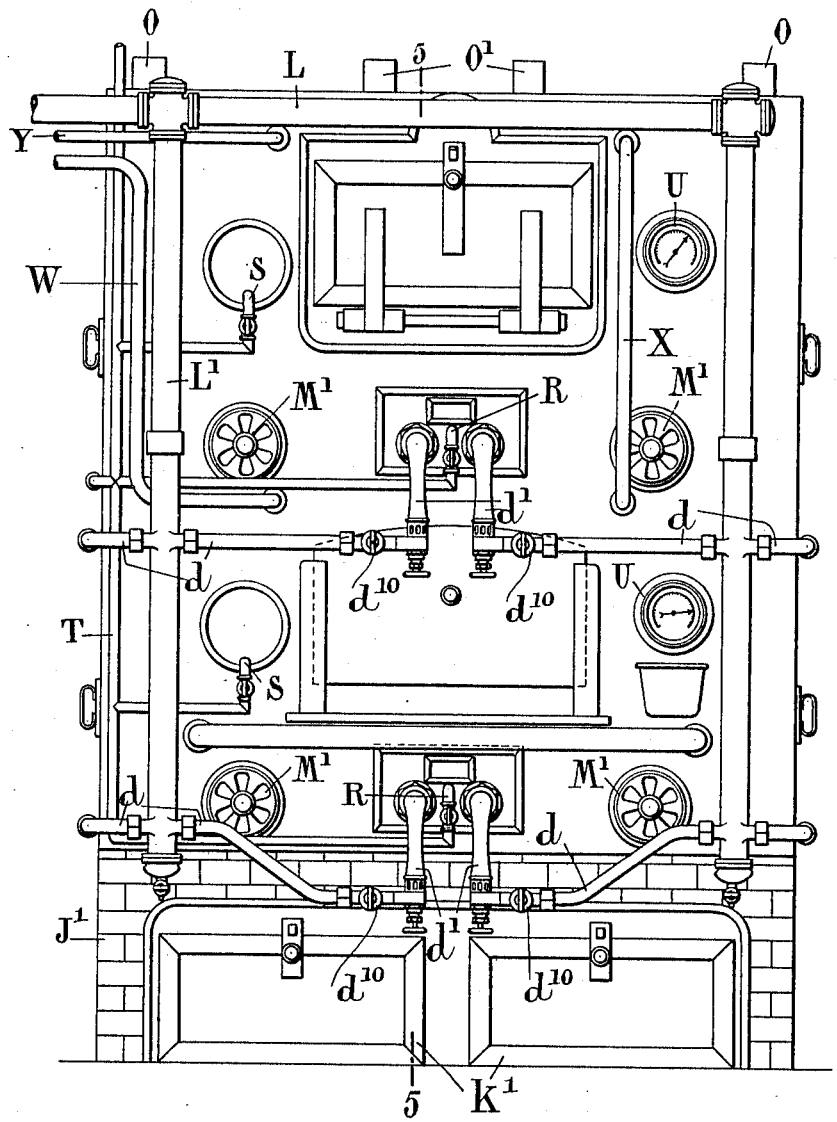
Figure 4:
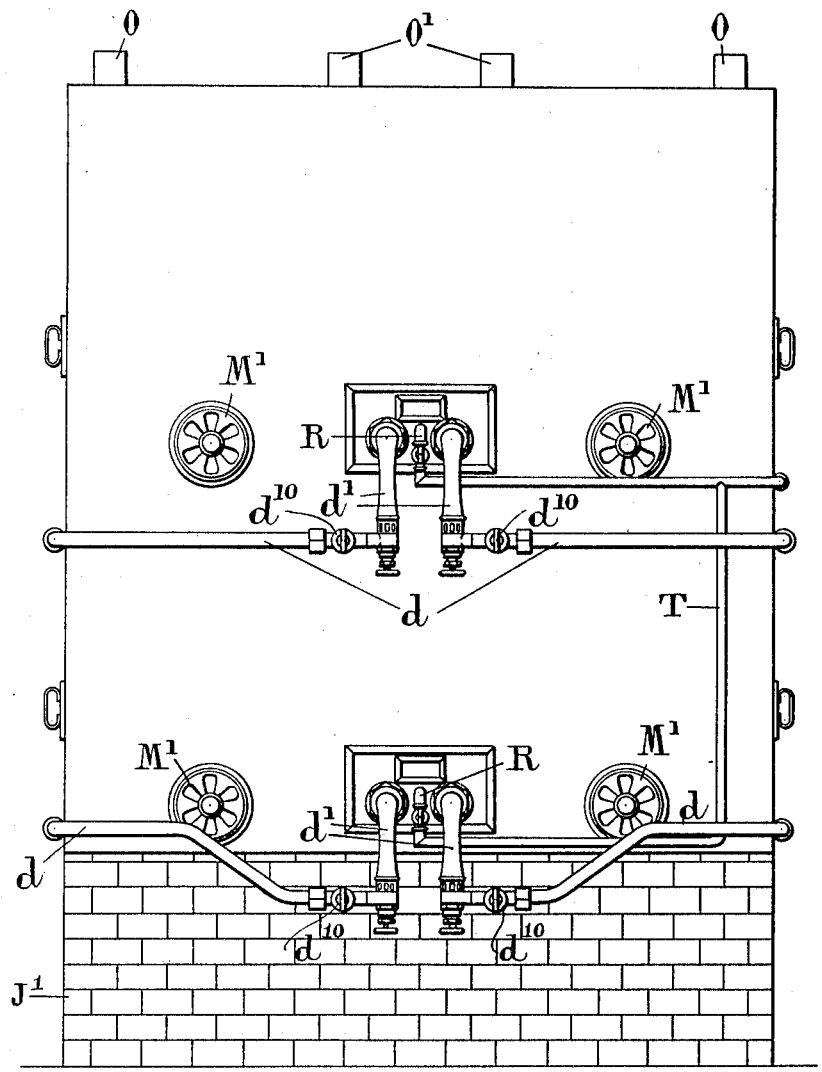
Figure 5:
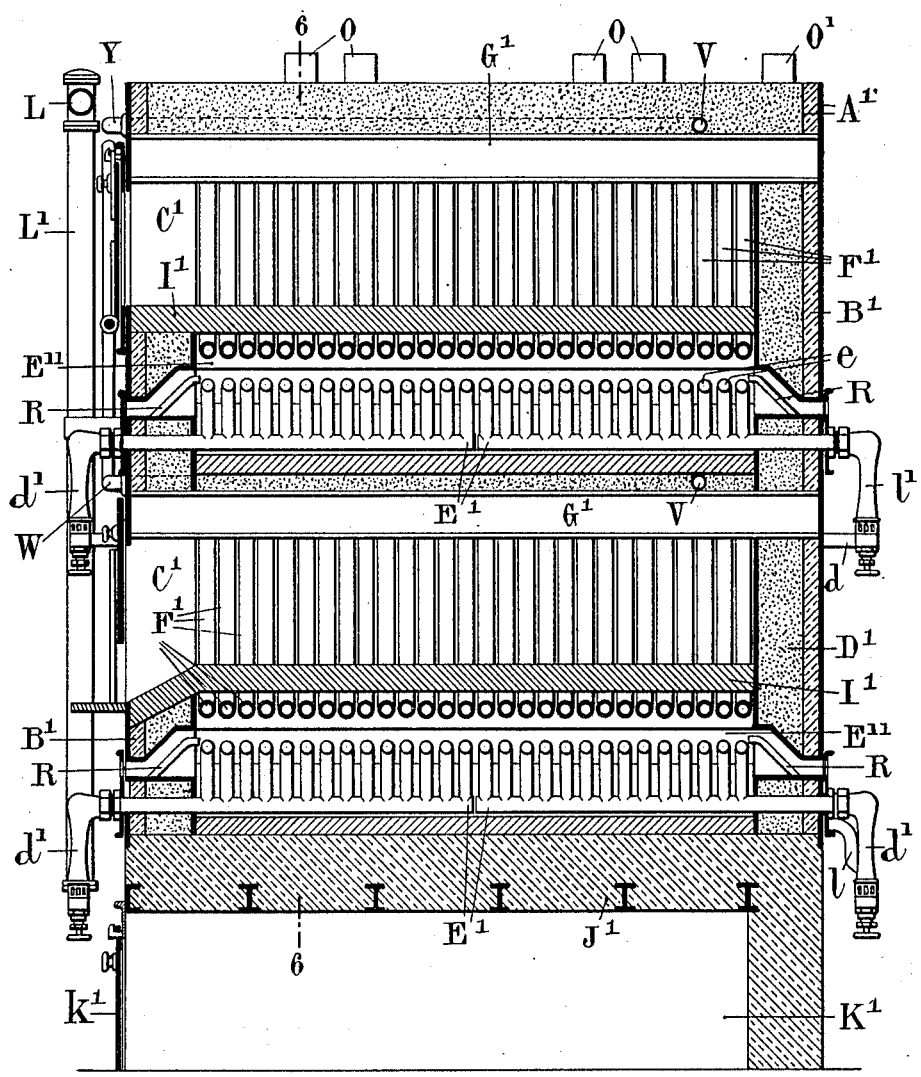
Figure 6:
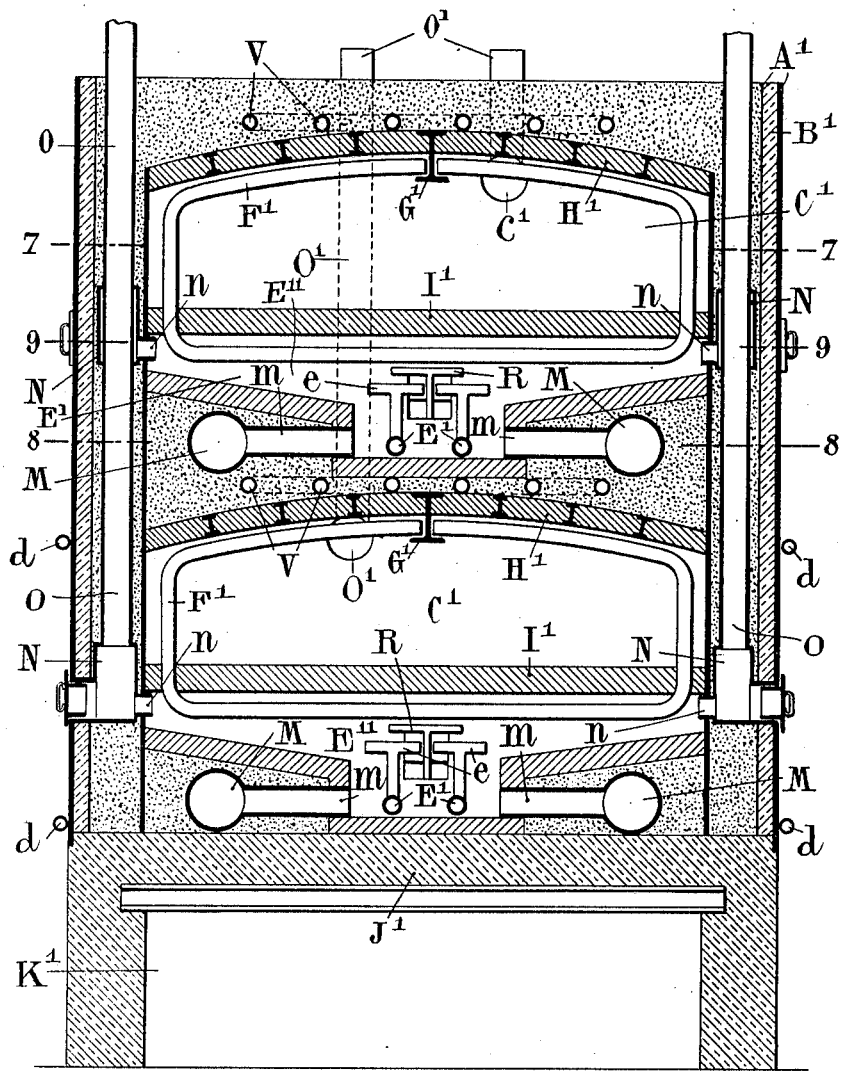
Figure 7:
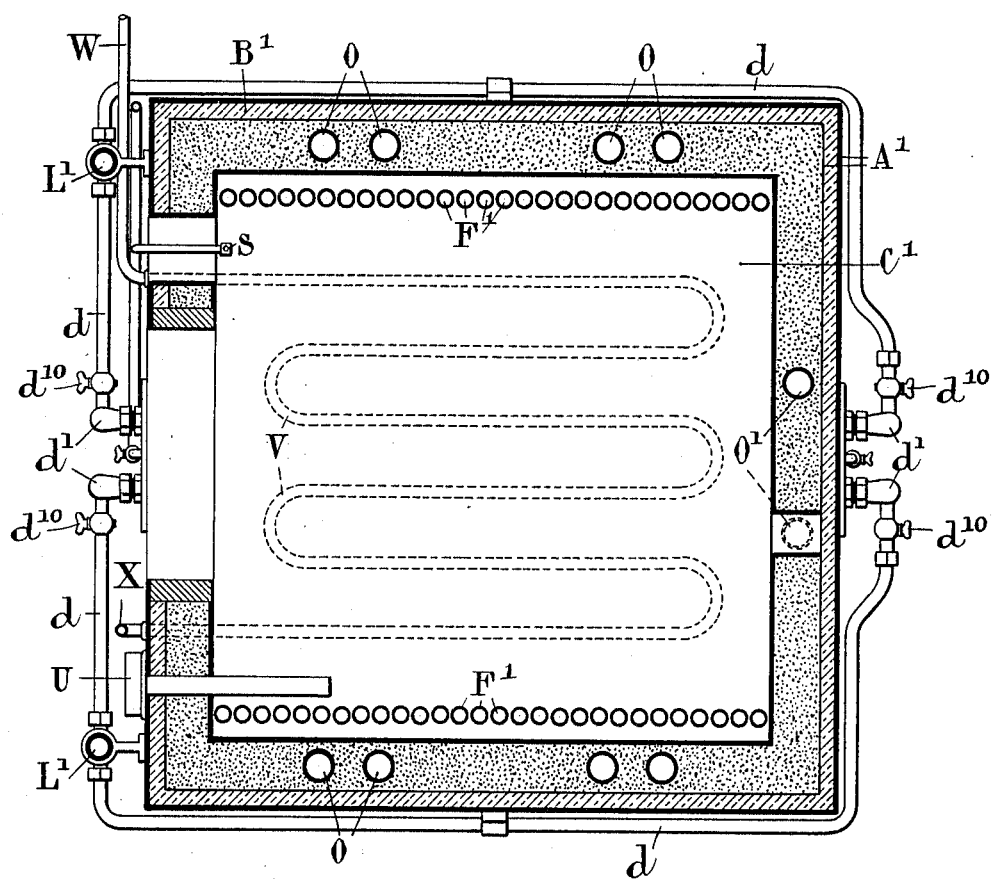
Figure 8:
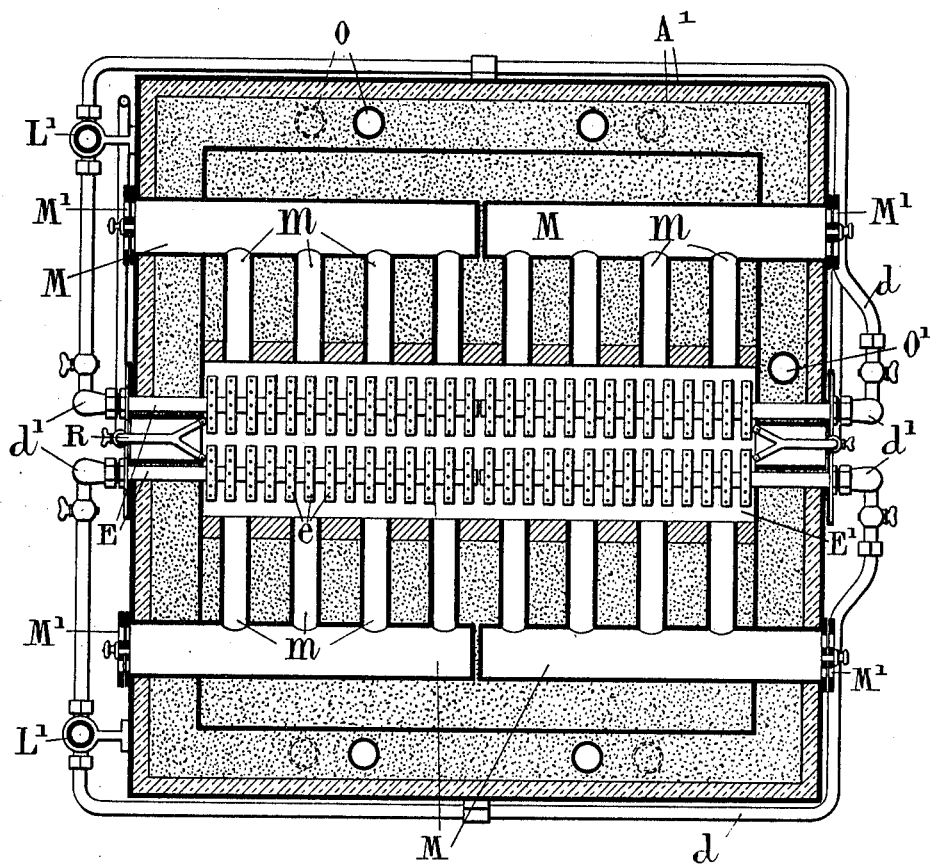

Figure 1 is a vertical cross section of a simple construction of the oven. Fig. 2 is a vertical longitudinal section thereof substantially on the line 2—2 of Fig. 1. Fig. 3 is a front elevation and Fig. 4 a rear elevation of another form of construction of a gas heated oven of large capacity. Fig. 5 is a longitudinal vertical section on the line 5—5 of Fig. 3. Fig. 6 is a cross section on the line 6—6 of Fig. 5. Figs. 7, 8 and 9 are respectively sections on lines 7—7, 8—8 and 9—9 of Fig. 6, showing the interior structure of the various chambers of the oven. Fig. 10 is an enlarged sectional detail view of a gas injector for use with the oven, and Fig. 11 is a section on the same scale as Fig. 10 of an element of the gas burner.

Referring to the construction represented in Figs. 1 and 2, A indicates a sheet metal casing inclosing a lining B of asbestos or other material which is a non-conductor of heat. The inner walls of the oven are formed by sheet metal partitions C separated from the asbestos lining B by a bed of sand D. At the lower part of the oven there is located in a cavity provided for the purpose a gas burner E having a row of orifices or jets above which are disposed pipes F bent in the form of flattened rings which bear at their lower parts on the bottom of the oven and are supported at their upper parts by a flanged bar G fitted into the end walls of the furnace. The number and diameter of the pipes F may be varied according to requirements. The said pipes F are entirely or partially filled with a liquid such as oil, having a boiling point higher than the temperature intended to prevail in the oven. Above the tubes F is disposed an arch H of sheet metal or of bricks supported and connected by small angle irons $H^1$. At their lower parts the tubes are covered by a sheet metal hearth I intended to receive the objects to be baked. The oven rests on a base J of brick work or metal, in which can be arranged drying chambers such as K; and further said base may support several similar ovens for installations of larger size.

It will be understood that when the burner E is lighted the jets not only heat the hearth I in the usual manner but also the liquid contained in the tubes F. The heat is transmitted to the upper parts of said tubes which in their turn heat by radiation the articles placed on the hearth F. In the form of construction shown in Figs. 3 to 11 the oven comprises two identical superposed compartments surrounded by a heat insulating jacket formed of a layer $D^1$ of sand inclosed within a sheet metal casing $A^1$ containing asbestos $B^1$. The whole is supported on a frame $J^1$ of masonry supported on I beams in which is formed a drying chamber $K^1$ closed at the front by doors $k^1$.

Each oven is independently heated by use of two series of parallel gas supply pipes $E^1$ each composed of two sections placed end to end and fed with gas as hereinafter described, through their outer extremity. The said pipes $E^1$ are provided with T shaped burners $e$ more particularly shown in Fig. 11 in the horizontal arms of which are the burner orifices $e^2$. Above said burners heating tubes $F^1$ are located which contain a liquid of high boiling point. The tubes $F^1$ are arranged parallel with the T shaped burners, which heat them for a sufficient length to assure rapid and intense heating thereof. The tubes are conveniently bent to completely surround the heating chamber $C^1$ and are held at their upper parts by an angle bar $G^1$ set in the roof $H^2$ of said chamber. The hearth $I^1$ above the lower run of the tubes $F^1$ is built in such a manner as to prevent any direct communication between the combustion chamber $E^{11}$ and the heating chamber $C^1$. The gas for effecting the heating of the oven is supplied by a pipe L feeding the branch pipes $L^1$ and $d$; the latter conducting the gas to injectors $d^1$ located at the end of each pipe $E^1$ at the two sides or ends of the oven.

The injectors which are clearly illustrated in detail in Fig. 10 each comprise a gas chamber $d^2$ surmounted by a conical cap $d^3$ which leads into the tube $d^1$ at the level of a series of air inlet orifices $d^4$. In the chamber $d^2$ is a hollow member $d^5$ having a conical end which engages in the conical cap $d^3$ and is provided with slits $d^6$ to render same elastic and so that it can be forced more or less into said cap $d^3$ to produce a variable opening at the upper part. The gas passes into this member $d^5$ through orifices $d^6$ in its walls and is discharged through the upper orifice in a volume according to the diameter of said orifice which can be regulated by means of a screw $d^7$ acting on the base of the member $d^5$ by which the discharge end of the latter can be forced more or less into the conical cap $d^3$. As aforesaid air enters through the orifices $d^4$, the size of which can be regulated by a ring $d^8$ having orifices $d^9$ and adapted to more or less close the orifices $d^4$ so that the quantity and proportions of the combustible mixture supplied to each row of burners can be adjusted in an exact manner. The tube $d^1$ is bent rectangularly at its upper end and is connected to the gas supply pipe $E^1$ by any approved form of union $E^2$. The pipes $d$ are provided with cocks $d^{10}$ whereby, one or more or any of the gas supply pipes $E^1$ may be placed into or out of commission.

Air for combustion is conducted to each chamber $E^{11}$ by lateral channels M having their inlets regulatable by means of dampers $M^1$. The said channels are provided with branch pipes $m$ which lead to the lower part and on each side of the chamber $E^{11}$. The burned gases are exhausted through tubes $n$ located at both sides and adjacent the top of the combustion chamber; said tubes $n$ conducting the gases into collecting chambers N embedded in the lateral layer of sand $D^1$ and in communication with uptakes O which carry away said gases. The vapors generated in the heating chambers during operation of the oven are exhausted through an uptake $O^1$ in communication with the upper part of each of said chambers and disposed in the wall of the oven to the rear thereof. Each of the combustion chambers $E^{11}$ is provided with an igniting jet R at each end of the burners for igniting same and burners S are provided having jets which are automatically ignited when the burners R are closed and lowered when they are opened. The jets S and R are fed with gas by a pipe T supplied from a small meter separate to that which supplies the large pipe L so as to prevent any accident which might result from improper manipulation of the cocks. The ignition jets can be kept constantly alight even during the night which prevents any accumulation of gas in the oven. A pyrometer U disposed on the outside of each oven is provided to indicate the temperature within such oven. Above the ovens and more especially the upper one, a water circulation coil tube V can be located, in order that heat may be utilized for providing hot water for various purposes incidental to the use of the oven, for example, for washing baking utensils or for mixing with the flour of which the dough is made so that the latter may rise more quickly. Water introduced through the pipe W circulates in the lower coil and then rises to upper coil through the pipe X whence it is led through pipe Y.

What I claim as my invention and desire to secure by Letters Patent of the United States is:—

1. A portable oven comprising a sheet metal casing, a heating chamber formed within same, a plurality of independent closed liquid containing tubes extending across the floor of said chamber and up near the walls and roof thereof, a hearth within said chamber above the lower horizontal runs of tubes and dividing off the lower part of said chamber to constitute a combustion chamber below separated from an oven chamber above, a plurality of burners disposed in said combustion chamber below the lower runs of tubes, and means for discharging gases of combustion from said combustion chamber comprising collecting chambers and uptake conduits disposed in the lining of the oven casing, a chamber in each of said uptakes and a valve in each of said last mentioned chambers to prevent inlet of cold air thereto.

2. A portable oven comprising a sheet metal casing, a heating chamber formed within same, a plurality of independent closed liquid containing tubes extending across the floor of said chamber and up near the walls and roof thereof, a hearth within said chamber above the lower horizontal runs of tubes and dividing off the lower part of said chamber to constitute a combustion chamber below separated from an oven chamber above a plurality of burners disposed in said combustion chamber below the lower runs of tubes, means for supplying gas to said burners, igniting jets for the burners, and independent means of supply for feeding said jets with gas.

3. A portable oven comprising a sheet metal casing, a heating chamber formed within same, a plurality of independent closed liquid containing tubes extending across the floor of said chamber and up near the walls and roof thereof, a hearth within said chamber above the lower horizontal runs of tubes and dividing off the lower part of said chamber to constitute a combustion chamber below separated from an oven chamber above, and a plurality of burners disposed in said combustion chamber below the lower runs of tubes, said burners comprising a feed pipe and series of T shaped burner jets extending there-from, the horizontal portions of which are parallel to the aforesaid tubes.

4. A portable oven comprising a sheet metal casing, a plurality of superposed heating chambers formed within said casing, a plurality of independent closed liquid containing tubes extending across the floor of said chamber and up near the walls and roof thereof, a hearth within said chamber above the lower horizontal runs of tubes and dividing off the lower part of said chamber to constitute a combustion chamber below separated from an oven chamber above, a plurality of burners disposed in each of said combustion spaces below the lower runs of tubes, means for supply of air to said combustion chambers comprising lateral conduits and branch pipes leading to opposite sides of said burners and controllable means for supplying fuel to said burners whereby the superposed heating and combustion chambers may be independently brought into and out of operation.

In witness whereof I have signed this specification in the presence of two witnesses.

CHARLES ANDRÉ.

Witnesses:
 JEAN GERMAIN,
 GUILLAUME PIOCHE.

Copies of this patent may be obtained for five cents each, by addressing the "Commissioner of Patents, Washington, D. C."